United States Patent [19]
Acknin et al.

[11] Patent Number: 5,967,023
[45] Date of Patent: Oct. 19, 1999

[54] MECHANIZED FOOD MANUFACTURING PROCESS

[75] Inventors: Christian Acknin, Terssac; Philippe Raymond, Albi, both of France

[73] Assignee: Societe Civile B.A.R.H., Albi, France

[21] Appl. No.: 08/945,910

[22] PCT Filed: Apr. 17, 1996

[86] PCT No.: PCT/FR96/00579

§ 371 Date: Oct. 20, 1997

§ 102(e) Date: Oct. 20, 1997

[87] PCT Pub. No.: WO96/32844

PCT Pub. Date: Oct. 24, 1996

[30] Foreign Application Priority Data

Apr. 21, 1995 [FR] France ................................ 95 05041

[51] Int. Cl.$^6$ .............................. A47J 27/62; A21C 1/00; A21C 9/04; G07F 9/10
[52] U.S. Cl. ................................ 99/348; 99/353; 99/355; 99/427
[58] Field of Search .................. 99/326–333, 348, 99/339, 352–355, 323.5–323.9, 450.1, 450.2, 450.4, 450.6, 450.7, 494, 516, 427, 443 C; 364/400; 366/129, 150.1, 130, 601; 426/87, 112, 113, 120, 124, 128, 394, 412, 520

[56] References Cited

U.S. PATENT DOCUMENTS

| | | | |
|---|---|---|---|
| 4,550,653 | 11/1985 | Hedenberg | 99/348 |
| 4,803,086 | 2/1989 | Hedenberg | 99/348 |
| 5,309,825 | 5/1994 | Pinone . | |
| 5,365,835 | 11/1994 | Naramura . | |
| 5,419,238 | 5/1995 | Pinone | 99/323.6 |

FOREIGN PATENT DOCUMENTS

| | | |
|---|---|---|
| 0113327 | 7/1984 | European Pat. Off. . |
| 0224416 | 6/1987 | European Pat. Off. . |
| 2389947 | 12/1978 | France . |
| 2597319 | 10/1987 | France . |
| 8603931 | 7/1986 | WIPO . |
| 9215183 | 9/1992 | WIPO . |

*Primary Examiner*—Timothy F. Simone
*Attorney, Agent, or Firm*—Harrison & Egbert

[57] ABSTRACT

A mechanized food manufacturing for manufacturing savory or sweet foods based on pastry and dry or wet, liquid, solid or pasty ingredients held in specific sachets. The pastry sachets are processed first in order to make the pastry and spread it over a cooking device. The process is carried out by mechanized, programmed devices. The ingredient sachet is then processed by mechanized programmable devices. So as to enable the sachet to be opened and its contents to be spread over the cooked, precooked or ready-to-cook pastry, the configuration of the sachets and the topographical distribution of the ingredients in the sachet cooperate with the relative movements of the cooking device so as to enable a calculated amount of the ingredients to be spread randomly or geometrically.

10 Claims, 9 Drawing Sheets

MECHANIZED FOOD MANUFACTURING PROCESS

TECHNICAL FIELD

The purpose of this invention is a mechanical fabrication process for salty or sweet dishes using baking dough and ingredients contained in special dosing units and the machine therefor. Such dishes may be pizzas or pies.

BACKGROUND ART

Patent application FR 95.04498 of Apr. 12, 1995 filed by the present applicants describes a fabrication process for such dishes from ingredients contained in special dosing units designed to receive the wet and dry products to be mixed and the ingredients such as tomato sauce, anchovies, cheese, etc.

Patent WO A 9215183 (SYNINTEL) describes a machine to bake a soft dough intended to remain soft after baking to make a pancake. It uses two baking units in the form of a drum with one unit baking one face and the other the other face of the pancake. This machine does not provide for the placement of any garnish whatsoever on the dough. In that patent, the required transfer of the baking dough from one face of the baking drum to the other makes the result uncertain.

Patent WO86/03931 describes a breadmaking machine. This machine includes a heated enclosure which acts both as a product mixing chamber, as a dough fermentation chamber and as a closed baking oven.

SUMMARY OF THE INVENTION

This application concerns more specifically the fabrication process using such dosing units and a suitable machine which is part of the invention; the process under the invention making it possible to achieve an optimum organoleptic, dietary and sanitary result.

For this purpose, the fabrication process for dough-based salty or sweet dishes from dosing units to make the dough by mixing the water and flour doses contained in said dosing units and from special ingredient dosing units, with the dough poured on a baking unit made of flat plates heated in an oven, is mainly characterized in that:

the dough dosing units are processed first to make the dough and spread it on a baking unit, such processing being carried out by an operating device which grasps each dosing unit and transfers it to a preparing device for dough dosing units;

the ingredient or condiment dosing units are then processed to be opened and their contents spread over the dough using one of the operating and preparing devices for condiment dosing units, with the configuration of the dosing unit and/or the topographic distribution of the ingredients in the dosing unit cooperating with the rotary movements of the plates in relation to the pouring direction so as to achieve a calculated random or geometrical distribution of the ingredients.

According to the invention, the machine to fabricate dough-based salty or sweet dishes by mixing the water and flour doses from dosing units containing the water and flour and from special ingredient dosing units, the dough being poured onto a baking unit made of a plate heated in an oven, is mainly characterized in that it includes:

a storage area for the dough and ingredient dosing units;

a drawing and operating system for the dough dosing units and an operating system for the ingredient dosing units allowing for transfer, with preparation of the dough by mixing water and flour, from the storage area to the baking unit, with in a first step baking of the dough and in a second step pouring of the ingredients or garnish and final baking.

Other advantages and characteristics of the invention will become apparent when reading the description below of embodiments of the invention given as non limiting examples, and illustrated in the attached drawings.

DETAILED DESCRIPTION OF THE PRESENT INVENTION

Figure 1:
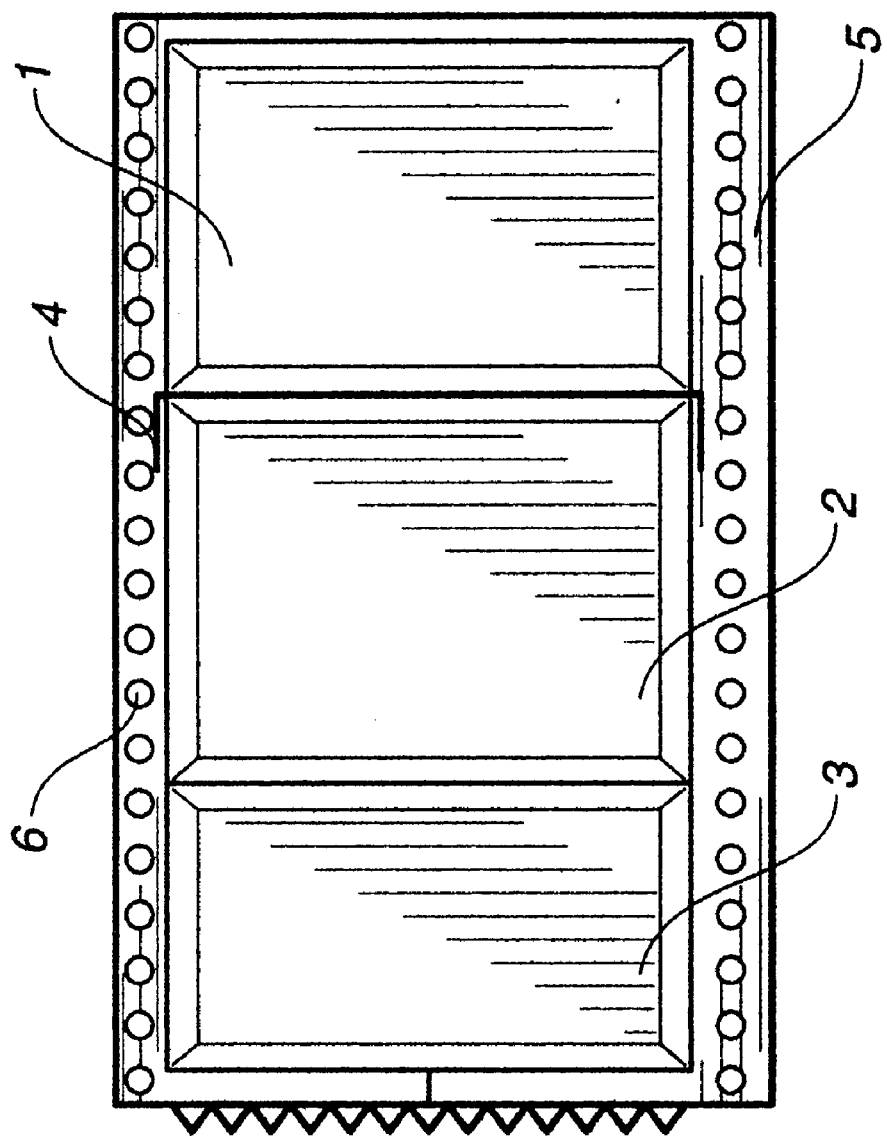
FIG. 1 shows a dough dosing unit.

In the process under the invention, specific dosing units are used, such as those described in a prior patent application by the same applicants. Packagings or dough dosing units such as those represented in FIG. 1, or ingredient dosing units such as those represented in FIG. 2 are used.

The dough dosing unit includes at least two enclosures 1 and 2 containing the dry and/or powdery ingredients such as flour and the wet products, and may have an enclosure 3 containing another ingredient which may, for example, be a sauce.

Enclosures 1 and 2 are separated by means of a hermetically sealed separation 4 which can be an articulated or ratchet type tong.

The dosing unit features a frame 5 with rows of parallel perforations 6 which allow for operation through a synchronous belt or wheel engaged with the perforations 6. Separation 4 is hermetically sealed and reversible so that, by removing separation 4, enclosures 1 and 2 are made to communicate with each other, which allows for the making of the dough.

Figure 2B:
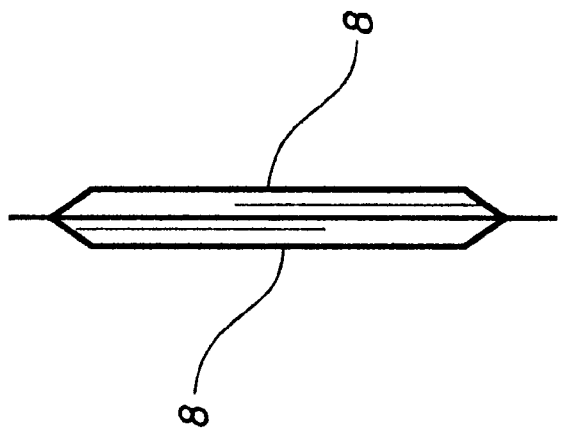
FIG. 2 shows an ingredient dosing, respectively.
Figure 2A:
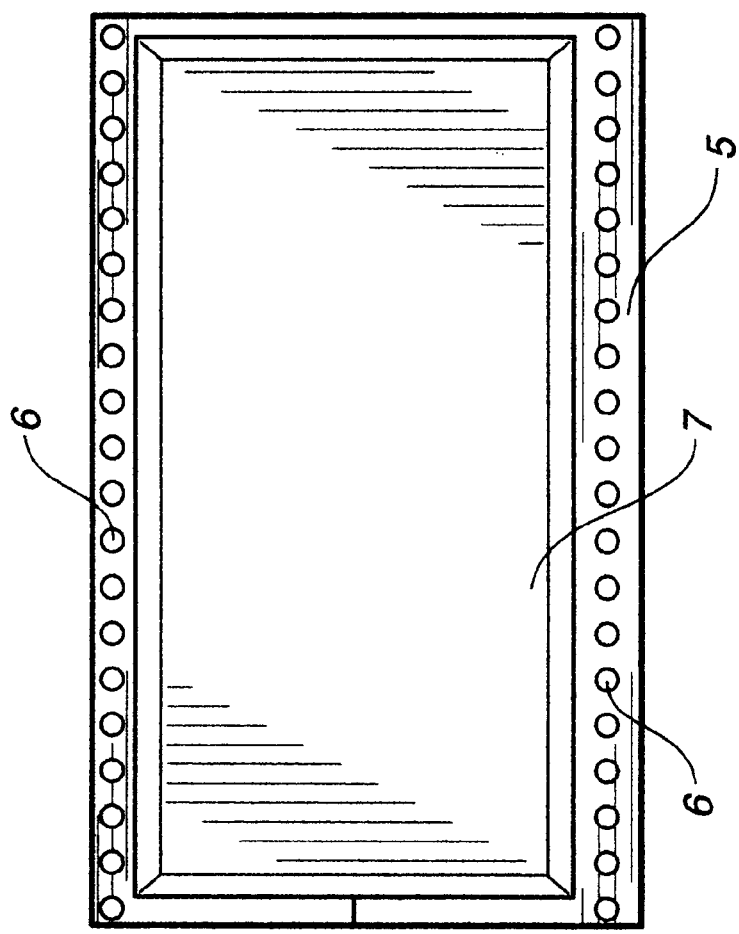

FIGS. 2A and 2B show an ingredient dosing unit which is a single enclosure 7 made of two sheets 8 welded to frame 5.

The ingredient dosing unit can be of a two-compartment type and intercalated, as described in the prior application by the same applicants.

The fabrication process under the invention for salty or sweet dishes using dough and ingredients includes the steps of:

first processing the dough dosing units from FIG. 1 to make the dough by opening hermetically sealed separation 4 thus putting water and flour in contact with each other, mixing the dry and wet ingredients, kneading the dough then spreading it on a baking unit;

then processing the ingredient dosing unit according to FIGS. 2A and 2B by opening and distributing its content over the spread dough beforehand on the baking unit.

At this stage of the process, the dough may already be baked or pre-baked or to be baked. According to the process under the invention, the configuration of the dosing unit and/or the topographic distribution of the ingredients in the dosing unit cooperating with the relative movements of the baking unit(s) in relation to the ingredient pouring direction achieves a calculated random or geometrical distribution of the ingredients over the dough.

Figure 3:
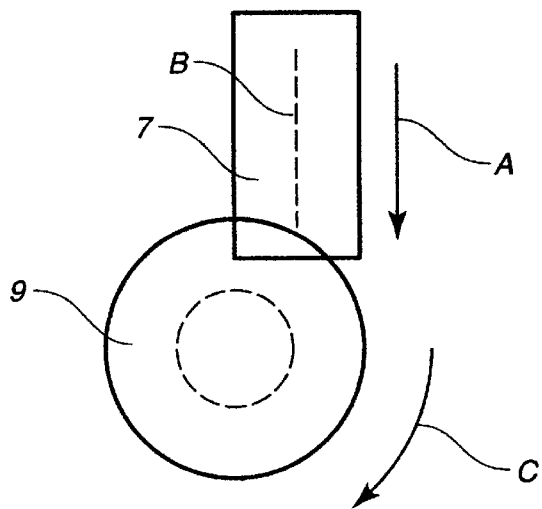
FIGS. 3, 4, 5 show various cases of ingredient laying patterns.
Figure 4:
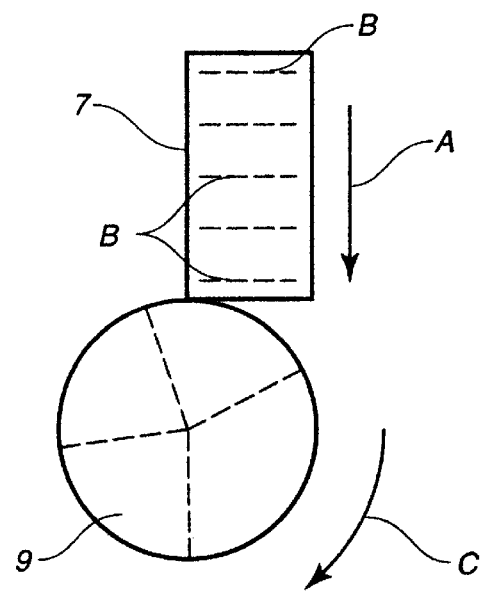
Figure 5:
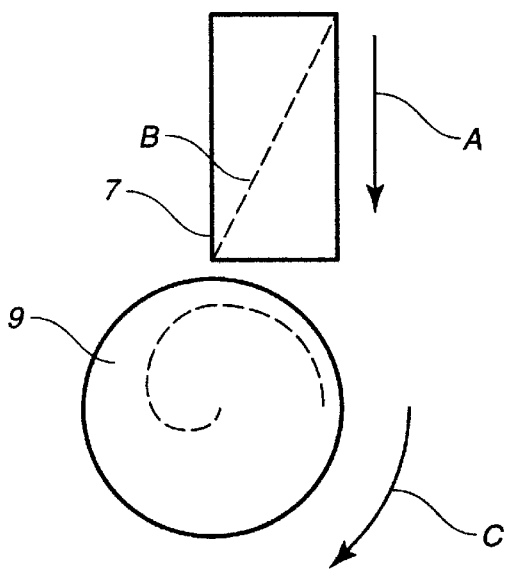

FIGS. 3, 4 and 5 are a schematic illustration of the implementation of the process. In FIGS. 3, 4, and 5, the dosing unit is indicated with the numeral 7. It is assumed to be opened. The pouring direction is represented by the lateral arrow A. The topographic arrangement of the ingredients is represented schematically by dotted line B which in the example of FIG. 3 is straight and median to the dosing unit.

The dough is poured onto a heating or heated plate 9 which during this operation is rotated through any known system in the direction of arrow C.

According to the topographic arrangement of the ingredients in the dosing unit from FIG. 3, the ingredients in line B shall be poured out roughly in a circle over the dough carried by plate 9.

According to the topographic arrangement of the ingredients in the dosing unit from FIG. 4, the ingredients arranged in line B, parallel to one another and transverse to the dosing unit and the pouring direction indicated with A, shall be distributed roughly in a star pattern over the dough carried by plate 9.

According to the topographic arrangement of the ingredients in the dosing unit from FIG. 5, the ingredients arranged along a line B oblique in relation to the pouring direction represented with A shall be distributed roughly in a spiral pattern over the dough carried by plate 9. The ingredients can be poured using any known method or system, for example, with a non-represented moving scraper on the dosing unit or as mentioned in the prior application by the same applicants through the winding of one of the sheets 8 making up the dosing unit onto a transverse axle.

In this case, the ingredients arranged in bulk and without specific topographic order, such as sauce, garnish, vegetable, shall be randomly arranged. The random distribution of the various ingredients, especially those in small chunks, shall give a random distribution through linear distribution opposition and rotation of the plate.

Figure 6:
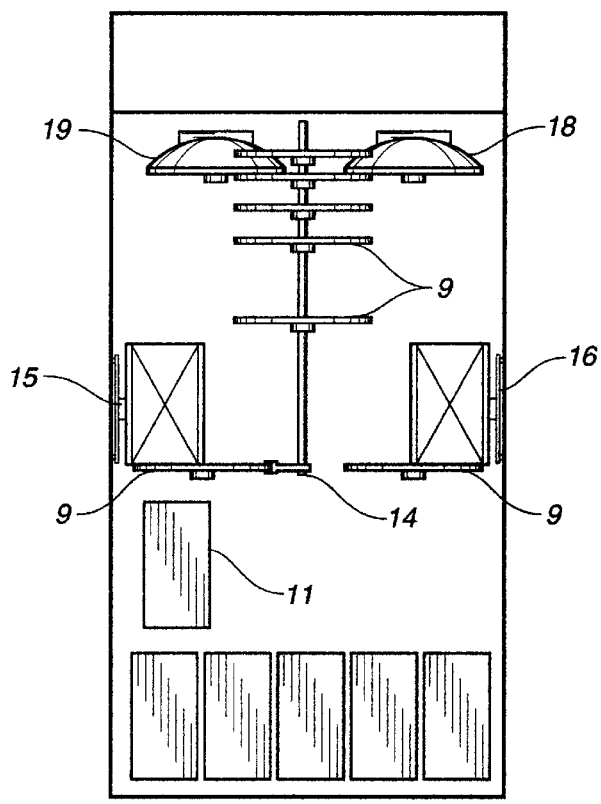
FIGS. 6 and 7 represent schematic front and side views of the machine shown in upright projection.
Figure 7:
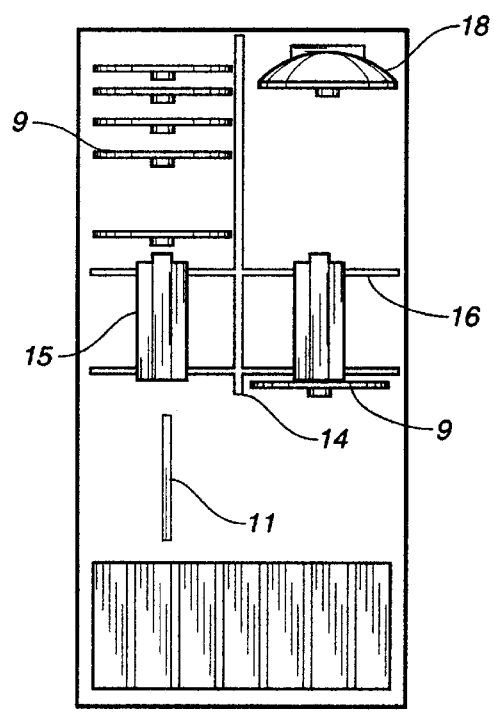

FIGS. 6 and 7 represent schematic front (FIG. 6) and side (FIG. 7) sectional and elevation views of the machine under the invention.

Figure 8:
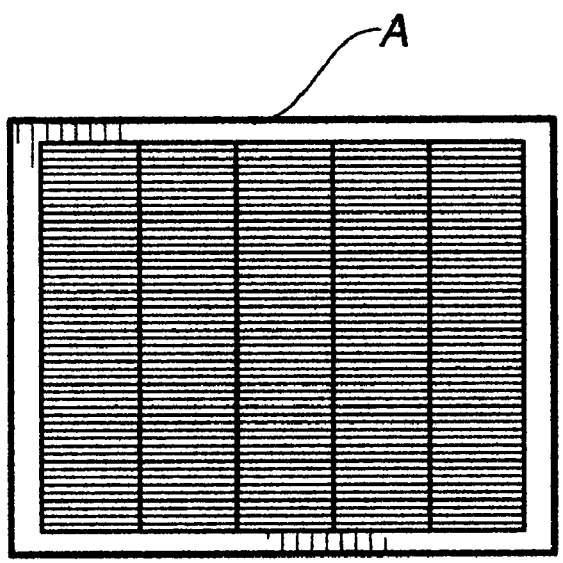
FIGS. 8 through 13 show top views of the machine at different stages of the machine corresponding to marks A through E on FIGS. 6–7, FIGS. 14, 15, 16 represent three types of tools used to act on the dough-related operations.
Figure 9:
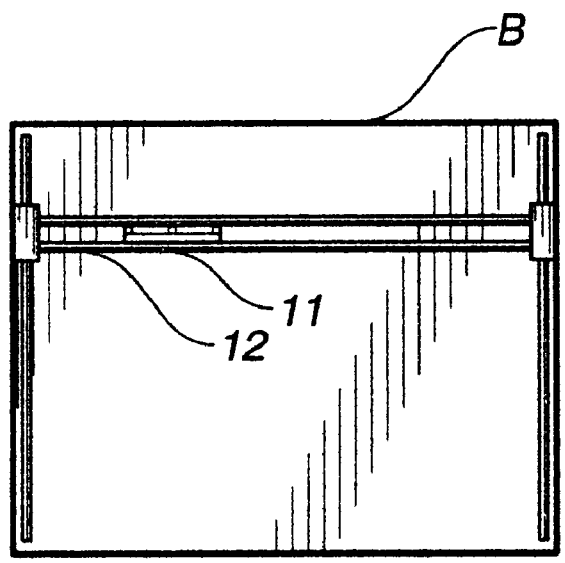
Figure 10:
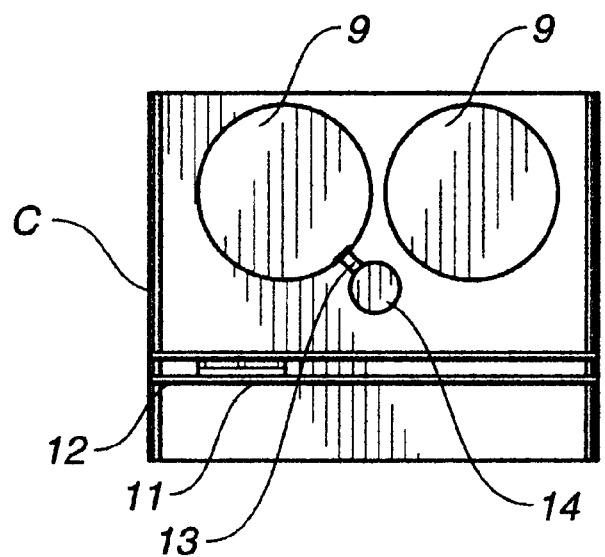

FIGS. 8 through 13 show horizontal sectional views of the machine according to FIGS. 7 and 8 on which said sections are marked by dotted section lines A, B, C, D and E.

FIGS. 7 and 8 show a lower dosing unit storage level A generically referred to as 10 hereinafter. These can be without discrimination dough (or dough and sauce) dosing units according to FIG. 1 or ingredients dosing units according to FIG. 2. These dosing units can be arranged on edge in a container. They can be provided with an identification system to be read through a suitable system, for example a bar code and bar code sensor, the data sensed being transmitted to a computerized system designed to select the processing program according to the type of dosing unit sensed.

FIG. 8 is a top view of stage A. A dosing unit operating device (indicated with letter B in FIGS. 9 and 10) grasps one of the dosing units. As represented on FIGS. 9 and 10, this device can be a tong 11 mobile along horizontal and vertical coordinates, carried by a gantry 12 (the tong moves along the gantry along a vehicle axis and the gantry is mobile on a track-mounted frame of a known type).

The dosing unit operator is schematically represented at stage B.

The dosing unit preparing device is represented at stage C. In both cases, two heating plates 9 are represented, designed to receive the dough and ingredients together with an operating arm 13 with a plate gripping tong at its end. This arm—there may be more than one—is mobile from top to bottom on a vertical axis 14 and rotates from left to right. Such mobility and rotation are achieved using any known system.

Figure 11:
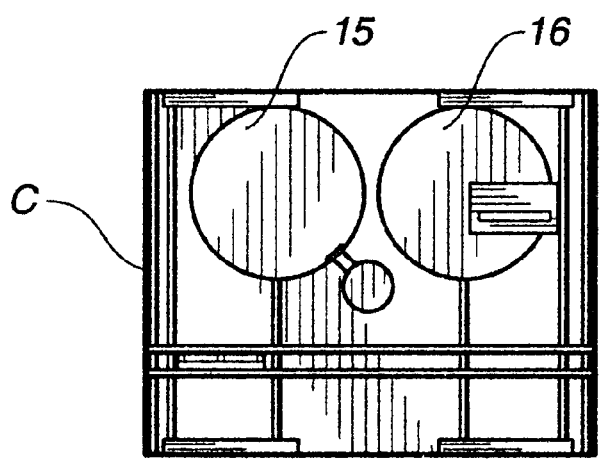

FIG. 11 is a schematic representation of a dough dosing unit preparing device 15 and an ingredient dosing unit preparing device 16, with the dough dosing unit preparing device 15 rotating on an axis to stir the dough and/or agitate the ingredients and facilitate the mixing.

Figure 12:
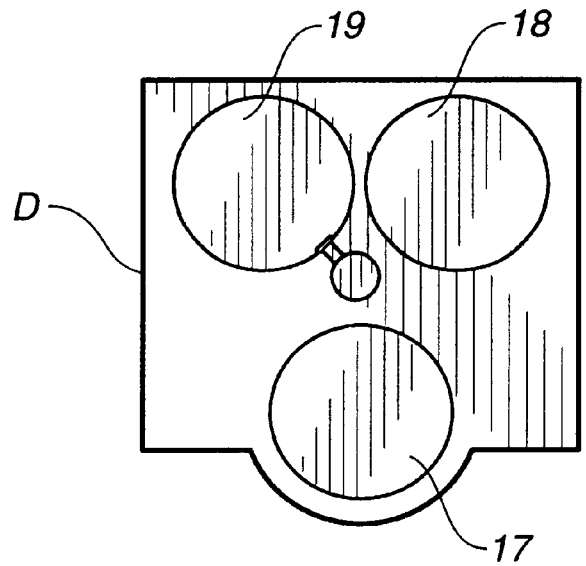
Figure 13:
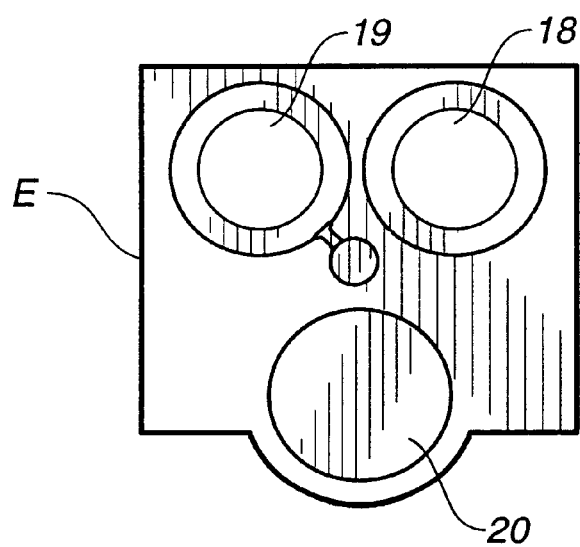

FIG. 12 shows a manual lay down area 17 in case of intervention for the laying of ingredients, the location of pre-baking ovens 18 and baking ovens 19, and the prepared dish release area 20.

As shown in FIG. 6, the machine features multiple heating plates 9 in accordance with the dough, sauce and ingredient receiver at the various dish fabrication steps to allow for continuous fabrication.

The heating plates are made of circular plates equipped with a device designed to engage them with a rotation device of any known type from which them can be separated to be transferred to other stations, such as the baking station(s) and the prepared dish gripping station(s). To that effect, the machine may also have multiple operating devices and preparing devices.

Each one of dosing unit preparing devices 15 and 16 is equipped with a number of tools designed to act on the dosing unit.

Figure 14:
Figure 15:
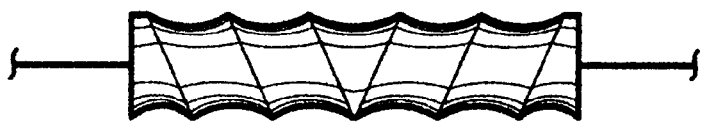
Figure 16:
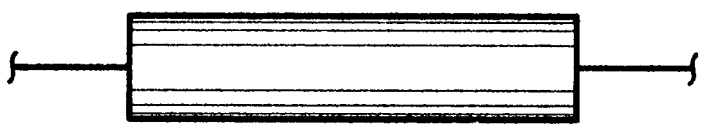
Figure 17A:
FIG. 17 illustrates the kneading, uncapping, laminating and extracting operations and lamination with product discharge.
Figure 17B:
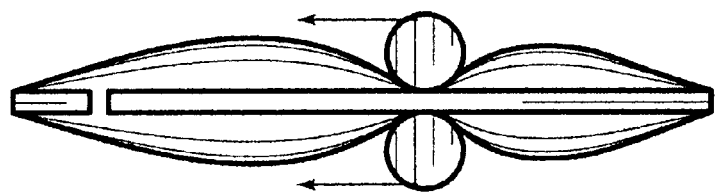
Figure 17C:
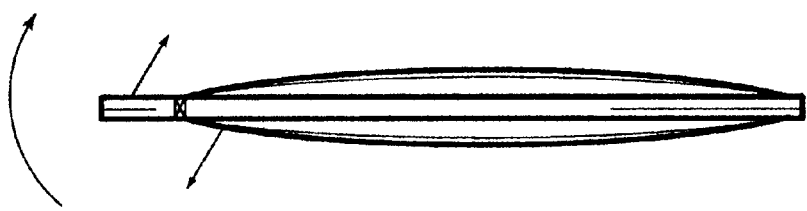
Figure 17D:
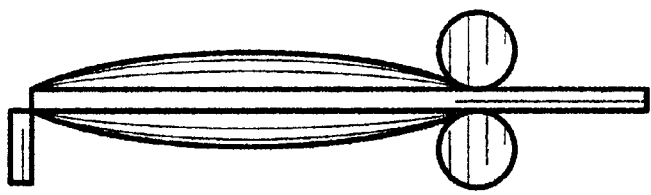

Each operating device is made of preferably one of two turret heads not represented to simplify the drawings. The turret heads, whenever there are two of them, are placed one below the other and free to move along the longitudinal axis of the dosing unit or conversely, the dosing unit can be moved back and forth. Each turret head rotates and permits to position three types of tools schematically represented in FIGS. 14, 15, 16 in relation to the dosing unit:

a hook tool (FIG. 14), a kneading tool (FIG. 15), and a laminating tool (FIG. 16).

These tools are designed to be used for the dough-related operations, sauce-related operations and ingredient-related operations.

The hook tool is used to release the tong separating the flour enclosure and the water enclosure of the dough dosing unit and to open the enclosure after dough kneading or to open the sauce enclosure.

The kneading tool is a worm roller.

The laminating tool is a smooth roller. Unclipping (tong opening, . . . ), kneading, uncapping and laminating and extracting operations, lamination with discharge of the products are represented in A, B, C and D of FIG. 17.

As shown in FIGS. 6 and 7, after kneading and pouring of the dough onto one of plates 9, it is transferred to a baking station including an oven 18 or 19. The machine includes at least one oven and preferably two, one assigned to dough pre-baking and one which may be assigned to final baking after the ingredients have been poured. In case of dough pre-baking before lay down, the plate with the pre-baked dough is transferred from the first oven to the ingredient pouring station then to the second oven. Ovens may be of any known type.

We claim:

1. A machine for fabricating a salty or sweet dish of dough by mixing a water and flour dose from a dough dosing unit which contain the water and flour dose and from a special ingredient dosing unit, the machine comprising:

- a storage area for the dough dosing unit and the special ingredient dosing unit; a baking unit having a plate received within an oven;
- an operating means for the dough dosing unit, said operating means for the dough dosing unit for mixing the water and flour, said operating system for the dough dosing unit for passing the dough from said storage area to said baking unit, said operating means for the dough dosing units for initially baking of the dough in the baking unit;
- an operating means for the ingredient dosing unit, said operating means for the ingredient dosing unit for pouring a special ingredient onto the initially baked dough, said operating means for the dough dosing unit for finally baking of the salty or sweet dish in the baking unit.

2. The machine of claim 1, said operating means for the dough dosing unit comprising a transfer means for grasping each of said dough dosing unit and said special ingredient dosing unit and for transferring each of said units to a preparation area.

3. The machine of claim 1, said operating means for the dough dosing unit for mixing the flour and the water, for opening the dough dosing unit, for spreading the dough on said plate, for opening a sauce enclosure and for emptying a sauce from said sauce enclosure onto the spread dough.

4. The machine of claim 1, said operating means of said special ingredient dosing unit for distributing said special ingredient in a random or geometric pattern onto the dough.

5. The machine of claim 1, further comprising:

- a plurality of mobile plates intercalated between said storage area and said baking unit.

6. The machine of claim 1, said operating means for said dough dosing unit comprising at least one operating arm connected thereto, said operating arm being mobile and rotatable along a vertical axis, each operating arm having a plate gripping tong operatively attached thereto.

7. The machine of claim 1, said baking unit having plurality of plates received on a turntable, said baking unit having means therein for rotating said turntable.

8. The machine of claim 1, said operating means for the dough dosing unit comprising:

- a rotary and mobile turret head; and
- a hook means affixed to said rotary and mobile turret head for opening said dough dosing unit.

9. The machine of claim 8, said rotary and mobile turret head comprising two turret heads positioned one below the other, said dough dosing unit being positioned between said two turret heads.

10. The machine of claim 1, each of said dough dosing unit and said special ingredient dosing unit having identification information attached thereto.

* * * * *